US009601044B2

(12) United States Patent
Grant

(10) Patent No.: US 9,601,044 B2
(45) Date of Patent: Mar. 21, 2017

(54) DISPLAY APPARATUS WITH PIXEL ELEMENTS THAT DISPLAY A SELECTION OF COLORS

(71) Applicant: Seeper Ltd, London (GB)

(72) Inventor: Evan Grant, London (GB)

(73) Assignee: Seeper Ltd., London (GB)

( * ) Notice: Subject to any disclaimer, the term of this patent is extended or adjusted under 35 U.S.C. 154(b) by 0 days.

(21) Appl. No.: 14/745,071

(22) Filed: Jun. 19, 2015

(65) Prior Publication Data

US 2015/0371578 A1 Dec. 24, 2015

(30) Foreign Application Priority Data

Jun. 20, 2014 (GB) .................................. 1411051.4

(51) Int. Cl.
*G06F 3/038* (2013.01)
*G09G 3/20* (2006.01)

(52) U.S. Cl.
CPC .................................. *G09G 3/2003* (2013.01)

(58) Field of Classification Search
USPC .......................................................... 345/205
See application file for complete search history.

(56) References Cited

U.S. PATENT DOCUMENTS

| | | | | | |
|---|---|---|---|---|---|
| 5,361,078 | A * | 11/1994 | Caine | G06F 3/1446 | 345/1.3 |
| 5,717,423 | A * | 2/1998 | Parker | G06F 3/016 | 345/108 |
| 6,462,840 | B1 | 10/2002 | Kravtsov | | |
| 7,602,351 | B1 | 10/2009 | Amidon | | |
| 8,552,883 | B1 | 10/2013 | Su | | |
| 2002/0105480 | A1 | 8/2002 | Lowry et al. | | |
| 2002/0196257 | A1 | 12/2002 | Paolini et al. | | |
| 2006/0256143 | A1 | 11/2006 | Kuekes et al. | | |
| 2013/0307756 | A1 | 11/2013 | Sweeney et al. | | |

FOREIGN PATENT DOCUMENTS

| | | | |
|---|---|---|---|
| JP | 2005252914 | A | 9/2005 |
| JP | 2005300641 | A | 10/2005 |

* cited by examiner

*Primary Examiner* — Gustavo Polo
(74) *Attorney, Agent, or Firm* — O'Shea Getz P.C.

(57) ABSTRACT

A display apparatus is provided that includes an array of pixel elements, a control arrangement, and a drive mechanism. Each array can display a selection of colors. Each pixel element is mounted at one end of an individual support member. Each support member can be displaced in forwards and reverse directions, and is hollow and has a longitudinally extending series of projections on an interior surface thereof. The control arrangement is operable to control the color that is displayed by each individual pixel element. The drive mechanism includes a gear which is engaged with the projections, and a motor for rotating the gear. Rotation of the gear causes longitudinal movement of the support member with respect to the drive mechanism.

13 Claims, 3 Drawing Sheets

DISPLAY APPARATUS WITH PIXEL ELEMENTS THAT DISPLAY A SELECTION OF COLORS

This application is entitled to the benefit of, and incorporates by reference essential subject matter disclosed in United Kingdom Application No. 1411051.4 filed on Jun. 20, 2014.

BACKGROUND OF THE INVENTION

1. Technical Field

This invention relates to display apparatus. In particular the invention relates to display apparatus which comprises an array of mechanical pixel elements, each of which can display a selection of colors.

2. Background Information

In GB 2504183, there is disclosed display apparatus comprising an array of pixel elements, each of which can display a selection of colors, and means for controlling the color that is displayed by each individual pixel element; wherein each pixel element is mounted at one end of an individual support member that can be displaced in forwards and reverse directions; means are provided for displacing each support member individually and there are means for controlling the extent to which each individual support member is displaced In GB 2504183 it is stated that the means for displacing the support members can be any known type of actuator, such as mechanical, electrical, electromechanical, hydraulic or pneumatic. It should be as silent as possible during operation, and provide a rapid response to control signals which, for example, instruct the actuator to move the support member forwards, backwards or to stop.

In an embodiment of GB 2504183, for each support member an individual electric motor is positioned beyond the other end of the support member from where the pixel is provided and drives a longitudinally extending screw that is engaged with a follower attached to the support member. Turning the motor in one direction drives the support member forwards, and turning the motor in the reverse direction drives the support member in the reverse direction.

SUMMARY OF THE INVENTION

An aim of the present invention is to provide an improved mechanism for driving the support members.

According to one aspect of the invention, there is provided display apparatus comprising an array of pixel elements, each of which can display a selection of colors, and means for controlling the color that is displayed by each individual pixel element; wherein each pixel element is mounted at one end of an individual support member that can be displaced in forwards and reverse directions; and means are provided for displacing each support member individually;

characterized in that each support member is hollow, a longitudinally extending series of projections are provided on an interior surface of the support member and the means for displacing each support member individually comprises a drive mechanism, the drive mechanism comprising a gear which is engaged with the projections, and a motor for rotating the gear, rotation of the gear causing longitudinal movement of the support member with respect to the drive mechanism.

In preferred embodiments of the invention the gear is in the form of a longitudinally extending helical drive member. The helical drive member may be in the form of a worm gear.

The series of projections may be in the form of teeth of a rack. There may a separate rack which is attached to the interior surface of the support member or the teeth of the rack may be formed integrally on the interior surface of the support member.

In embodiments of the invention, the drive mechanism is in a fixed position relative to the movable support member and at least some of the drive mechanism, including portions of the gear which are engaged with the projections on the support member, are disposed within the confines of the hollow support member. Preferably, at least some of the motor is disposed within the confines of the hollow support member. Expressed in a different way, in some embodiments of the invention both the gear and the electric motor are positioned within the longitudinal extent of the support member.

In embodiments of the invention, the support member has a U shaped cross section, with two side walls and an interconnecting wall. The support member is positioned over the drive mechanism which projects into the space between the side walls. The drive mechanism may be contained substantially wholly within the space between the side walls of the support member.

The projections may be provided on the interior surface of the interconnecting wall of the support member.

The series projections may extend longitudinal along all or only part of the support member. For example, in some embodiments the series of projections may terminate short of an end portion of the support member which extends from the pixel The motor may have a longitudinally extending drive shaft which is positioned adjacent one end of the helical drive member and is connected to said one end of the helical drive member. In some embodiments, a second motor is positioned adjacent the other end of the helical drive member and is connected to said other end of the helical drive member. An advantage of using two motors in this manner is that the available drive power can be increased, i.e. doubled, without increasing the lateral extent of a motor. This can be important as the drive mechanism is at least partly contained inside the hollow drive member.

The motor, or each motor, is preferably electric but may be hydraulic or pneumatic, for example.

In one embodiment a support member which is U shaped with two side walls and a top walls, is mounted on longitudinally spaced front and rear bearings which engage with interior of the top wall. Each set of bearings may comprise laterally spaced rotatable members such as wheels or rollers. One rotatable member may be positioned adjacent one side wall, and the other of the pair may be positioned adjacent the other side wall.

In some embodiment of the invention, there are resilient means, such as a spring or springs, engaging the side walls of the member to restrict side to side movement of the support member. In a preferred arrangement there are two longitudinally spaced resilient means.

A system may be provided to detect the position of the support member, such as a wheel and at least one optical sensor to detect movement of the wheel. Cut of switches may be provided to limit the extent of movement of the support member in either direction.

In GB 2504183, in the preferred embodiment as illustrated, light is transmitted to the pixel element at one end of the support member, from a light source adjacent the other end of the support member and the support member has walls that prevent leakage of light. Whilst such an arrangement is possible when using a drive mechanism in accordance with the present invention, in some cases it may be impractical because the at least part of the drive mechanism extends interior of the hollow support member contains the drive mechanism.

In preferred embodiments of the present invention, a light source for the pixel element is provided adjacent said one end of the support member. In such an arrangement the pixel element could have a transparent or translucent front surface, and the light source could be mounted immediately behind that surface or could be mounted at a short distance from it and project the light onto the rear of the surface. The light could be provided by any type of known illumination device, including optoelectronic devices such as a light emitting diode. The intensity of the light displayed could be variable.

Preferably, each pixel element can display a range of colors rather than just two as with a single light—which can be on or off. This could be provided in a number of different ways. For example, instead of a single light as discussed above, a plurality of lights could be provided, each with a different color. Additionally of alternatively, each light could be capable of displaying a plurality of colors; for example, a single light emitting diode device could be capable of displaying both blue and red light. In a preferred arrangement, each pixel element is provided with sources of red, green and blue light so that by mixing the output of these sources, a visible spectrum of colors can be provided. Means are provided to control the individual sources of light and their intensities.

The color displayed by each individual pixel element can be provided by other means. Thus, the arrangement may be such that each pixel element can display multiple colors simultaneously and for example can display part of an image. This can be achieved by making each pixel element as a small electronic display screen, such as an LCD or LCD or plasma screen, that can display any chosen color. This screen could display multiple colors and could display a part of an image.

In some embodiments, an end part of each support member, adjacent the pixel, could be transparent, translucent or semi-translucent, so that it too can display colors, as well as the pixel element. Thus, a source of light that illuminates a pixel element could also be used to illuminate a visible part of a support member when it is displaced forwards from the base configuration.

In some embodiments', the apparatus comprises a frame carrying the support members arranged in a rectangular array, first ends of each support member terminating in the pixel element which is rectangular and translucent. There may be a series of sub-frames each carrying a number of support elements, which are used to create a larger array.

In preferred embodiments a data processing module provides control signals to the individual light source and to the individual drive mechanism for each support member, thereby controlling the color and the spatial position of each pixel element independently. Thus, whatever is displayed on the display apparatus can be defined by different colors of the individual pixel elements, and by the spatial position of the individual pixel elements. A vivid, three dimensional effect can be provided.

Typically, there may be a base configuration in which all of the pixel elements lie in the same plane to define a flat surface. However, a base configuration could be one in which the surface is curved. A curved surface could for example be convex or concave or could be a mixture of concave and convex portions.

In some embodiments, each individual pixel element has a flat, forward facing surface which displays the selected color for that pixel at any given time. The forward facing surface could be rectangular, such as square or circular, triangular or any other shape. However in some embodiments of the invention the pixel elements can display colors by having a three dimensional display arrangement. For example, the pixel elements could be convex so as to display the colors both forwards and in lateral directions (i.e. any or all of left, right up and down). The pixel elements could display colors in substantially all directions, for example being in the form of spheres.

What is displayed may be static for a period of time, or continually changing, or could have static components and changing components. What is displayed may comprise characters, such as alphanumeric characters, and/or graphic components, and/or abstract components. In any event, what is displayed may include both shapes and colors.

The elements that make up a screen defining a pixel, such as LCD or LED elements, could be arranged on a flat surface, or could be arranged to provide a three dimensional display surface which could be convex to display in forwards and lateral directions, or substantially spherical to display in substantially all directions.

A preferred feature of embodiments of the invention is that the spatial positions of the individual pixel elements can be adjusted rapidly.

In one embodiment, adjacent the front of the display apparatus there is a grid with an array of apertures. Within each aperture there is mounted an individual elongate support member having opaque walls, carrying a pixel element, which can be slid forwards and backwards. A corresponding grid with apertures can be provided at a distance back from the first grid, so that each support member is itself supported at two spaced positions. A number of grids can be used to create a large array.

Display apparatus in accordance with the invention can be used to display information, advertisements and so forth, or can be used as a static or moving piece of art. The display apparatus could be provided in a building, either as art or to display, for example, the name and logo of a company. In serviced offices, for example, where companies may change regularly, the display apparatus could display a selected company logo in a vivid, three dimensional form.

In preferred embodiments, a data processing module is provided which is arranged to receive data representing material to be displayed on the display apparatus, and to control the colors of the individual pixels and their individual spatial positions through operation of the drive means, so as to display the material.

Viewed from another aspect, the invention provides a method of operating such display apparatus, wherein data representing material to be displayed on the display apparatus is input to the data processing control module, and the data processing control module controls the colors of the individual pixels and their individual spatial positions through operation of the drive means, so as to display the material.

In some embodiments of the invention, an imaging device such as a still or video camera can collect images from objects or people positioned in front of the display. Three dimensional data and/or motion data can be collected from a 3D depth camera or sensor, structure light camera, proximity sensor or similar motion sensor.

The image data can be analyzed by data processing means and the colors of the pixels and the positions of their support members could be controlled by the data processing means to display a three dimensional representation of the person or object.

BRIEF DESCRIPTION OF THE DRAWINGS

A specific embodiment of the invention will now be described by way of example only and with reference to the accompanying drawings, in which.

DETAILED DESCRIPTION

Figure 1:
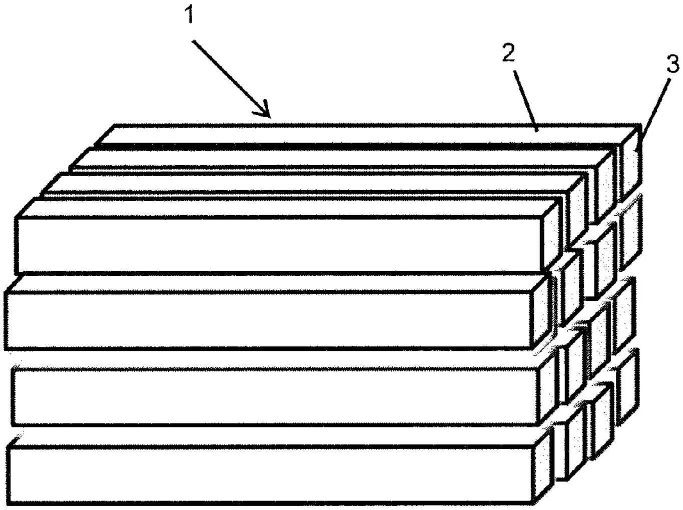
FIG. 1 is a perspective view of an array of support members.
Figure 2:
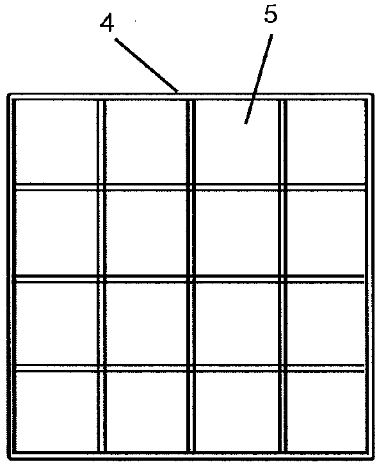
FIG. 2 is a front view of a grid for holding the support members.
Figure 3:
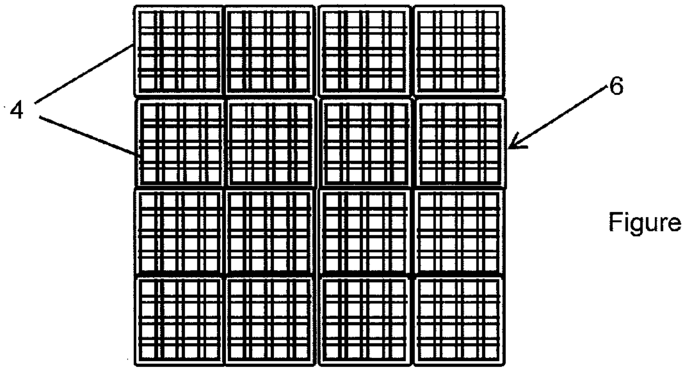
FIG. 3 shows an assembly of a number of grids to form a large array.
Figure 4:
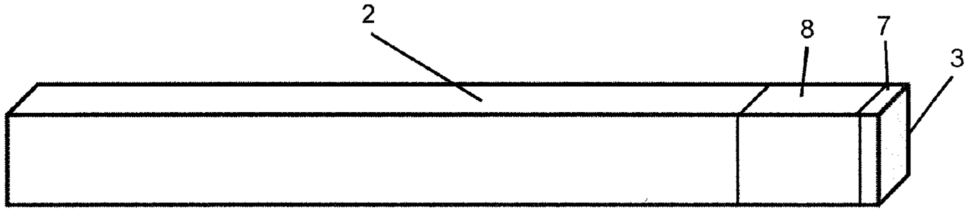
FIG. 4 is an enlarged view of a single support member
Figure 5:
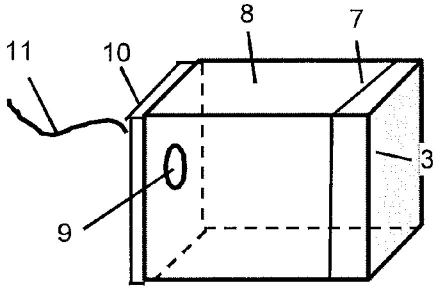
FIG. 5 is a detailed view of on end of the support member.

With reference to FIG. 1, there is shown a 4×4 array 1 of elongate support members 2, each of which has a pixel element 3 at its front end. As shown in FIG. 2, the support members are mounted in a grid 4, having sixteen spaces 5. FIG. 3 shows how a number of grids 4 are combined into a complete array so that, in this example, there is a total array of 16×16 support members and pixels. It will be appreciated that any number of support members with pixels can be arranged in any desired array. For example an array of 10×10 support members could provide a basic unit A single support member 2 is shown in more detail in FIGS. 4, 5 and 6. The pixel 3 is defined by the front face of a translucent element 7 which is mounted at the end of an end section 8 of the support member 2. This end section, which is hollow, contains a light source 9, which in this example comprises an LED emitting red, green and blue light under the control of circuitry on a board 10 which is linked by a cable 11 to a controller for the array. The controller determines whether the light source for a particular pixel is activated, and if so the color which is displayed. If desired, the walls of the end section 8 can be translucent so that they are illuminated at the same time as the pixel 3. The controller also determines the position of the support member, which is adjusted by the drive mechanism, part of which is shown in diagrammatic form in FIG. 6.

Figure 6:
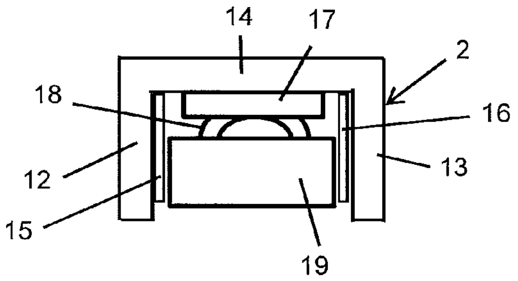
FIG. 6 is a section through the support member, showing part of the drive mechanism.
Figure 7:
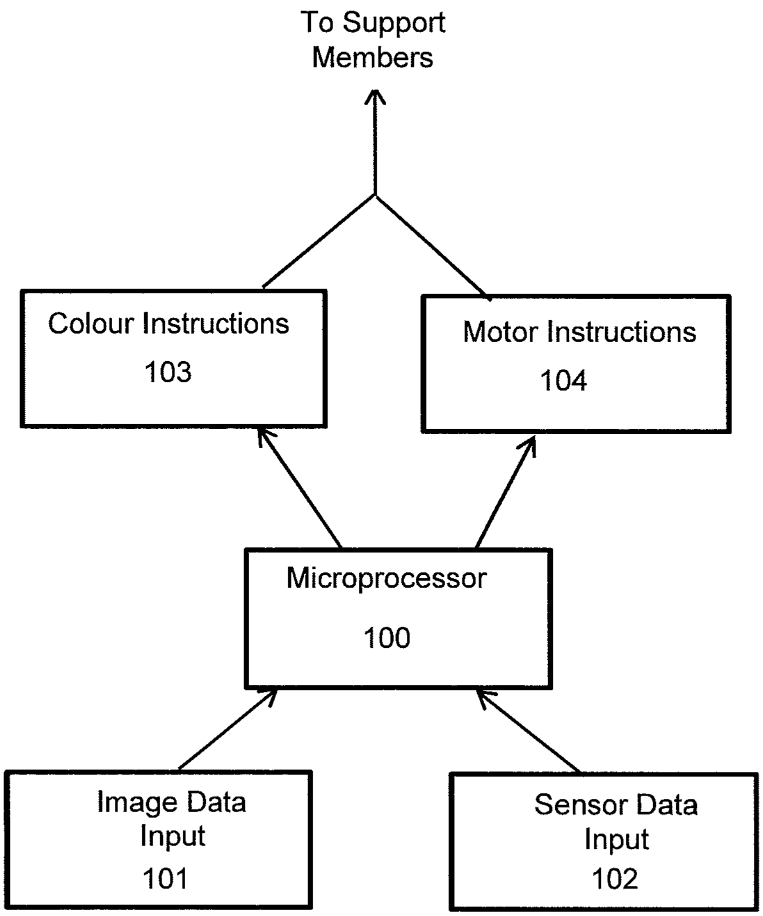
FIG. 7 is a detailed perspective view of the drive mechanism.

With reference to FIG. 6, which is diagrammatic, the support member is hollow, being of generally "U" cross section with a first side wall 12 and a second side wall 13, interconnected by a top wall 14. The top wall 14 is supported on a left bearing roller 15 and a right bearing roller 16. Provided on the inside of top wall 14 are teeth 17 of a longitudinally extending rack. The rack, and thus the support member, are moved by engagement of teeth 17 with a worm gear 18. This is driven by an electric motor 19 in accordance with instructions from the controller. The drive mechanism is shown in more detail in FIG. 8.

Figure 8:
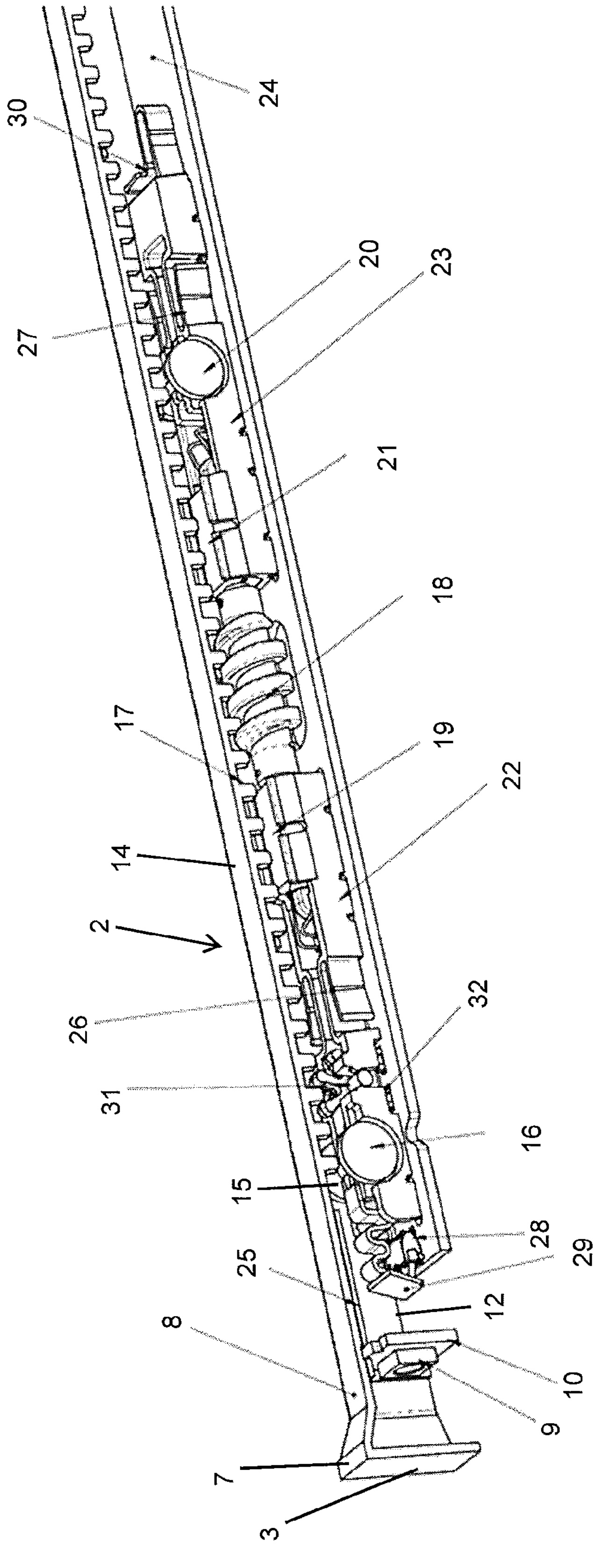
FIG. 8 is a diagrammatic view of a control system.

Both the drive mechanism motors and the illumination of the pixel 3 are controlled by the controller which, as shown in FIG. 8, includes a microprocessor 100. This receives input data 101 about the image to be displayed and also sensor data 102 regarding the position of the support members. Using this, the illumination of the individual pixels 3 is determined and transmitted at 103; and instructions for the motors is transmitted at 104 to control the positions of the support members and thus the spatial positions of the pixels. There is a channel for each individual support member and its associated pixel.

Referring now to FIG. 8, the construction of the system is shown in more detail. When there is a reference to "front" or "rear", the front is the end carrying the pixel 3. The support member 2 is supported not only on a front pair of bearing rollers 15 and 16, but also on a longitudinally spaced rear pair of rollers, only one of which 20 is visible. In addition to the front electric motor 19 which drives the worm gear 18, there is a longitudinally spaced rear electric motor 21 which also drives the worm gear, so as to increase the driving force. The front motor 19 is mounted on a front bracket 22 and the rear motor 21 is mounted in a rear bracket 23. The front and rear bearing rollers are also mounted in the respective brackets. The drive mechanism is mounted on main printed circuit board 24 and in this embodiment is located within the confines of the "U" shaped support member. The printed circuit board 24 is fixed and the support member moves relative to the drive mechanism, i.e. the motors and worm gear. An upper printed circuit board 25 is connected to the circuit board 10 for the LED 9. As this moves with the support member, it is connected to the controller by means of a flexible cable, such as a ribbon cable (not shown)s.

The support member is of molded plastics material in this embodiment and the teeth 17 of the rack are integrally molded on the interior of the top wall 14. The rack terminates short of the end section 8 of the support member.

Front side springs 26 bear against the side walls 12 and 13 of the support member, to reduce side to side movement of the member. Rear side springs 27 are also provided for the same purpose. In this embodiment the side springs are of plastic material.

A front switch 28 is provided to detect full movement of the support member to its rear position, and a spring 29 (e.g. of plastics material) is provided to protect this switch. A rear switch (not shown) is provided to detect full movement of the support member to its most forward position, and a spring 30 (e.g. of plastics material) is provided to protect this switch. The position of the support member is continually detected by a position tracking wheel 31, which operates in conjunction with optical sensors 32.

The invention claimed is:

1. A display apparatus comprising:

an array of pixel elements, each of which can display a selection of colors, each pixel element being mounted at one end of an individual support member, wherein each support member can be displaced in forwards and reverse directions, is hollow and has a longitudinally extending series of projections on an interior surface thereof;

a control arrangement for controlling the color that is displayed by each individual pixel element; and a drive mechanism comprising a gear which is engaged with the projections, and a motor for rotating the gear, rotation of the gear causing longitudinal movement of the support member with respect to the drive mechanism; wherein the support member is of generally "U" shaped cross section, with opposed side walls connected by a top wall, and the series of projections are on the interior of the top wall; and a first pair of laterally spaced rotatable bearing members are engaged with the top wall and a second pair of laterally spaced rotatable bearing members are engaged with the top wall, the first pair of bearing members being longitudinally spaced from the second pair of bearing members.

2. The display apparatus claimed in claim 1, wherein the gear is in the form of a longitudinally extending helical drive member.

3. The display apparatus claimed in claim 2, wherein the helical drive member is in the form of a worm gear.

4. The display apparatus claimed in claim 1, wherein the series of projections form a rack.

5. The display apparatus claimed in claim 1, arranged to apply a resilient force to the side walls of the support member to limit lateral movement of the support member.

6. The display apparatus claimed in claim 5, wherein said resilient force is applied by a first spring engaging one side wall and a second spring engaging the other side wall to apply said resilient force.

7. The display apparatus claimed in claim 5, comprising first and second arrangements for applying a-said resilient force to the side walls of the support member, wherein the first and second arrangements apply force at places longitudinally spaced from each other.

8. The display apparatus claimed in claim 1, comprising first and second motors to drive the gear, the first motor and the second motor being longitudinally spaced from each other.

9. The display apparatus claimed in claim 1 wherein the gear and the motor are positioned within a longitudinal extent of the support member.

10. The display apparatus claimed in claim 9, wherein the gear and the motor are at least in part contained within the hollow support member.

11. The display apparatus claimed in claim 1, arranged to apply a resilient force to the side walls of the support member to limit lateral movement of the support member.

12. A display apparatus comprising:

an array of pixel elements, each of which can display a selection of colors, each pixel element being mounted at one end of an individual support member, wherein each support member can be displaced in forwards and reverse directions, is hollow and has a longitudinally extending series of projections on an interior surface thereof;

a control arrangement for controlling the color that is displayed by each individual pixel element; and a drive mechanism comprising a gear which is engaged with the projections, and a motor for rotating the gear, rotation of the gear causing longitudinal movement of the support member with respect to the drive mechanism; wherein the support member is of generally "U" shaped cross section, with opposed side walls connected by a top wall, and the series of projections are on the interior of the top wall; and the display apparatus is arranged to apply a resilient force to the side walls of the support member to limit lateral movement of the support member, wherein said resilient force is applied by a first spring engaging one side wall and a second spring engaging the other side wall to apply said resilient force.

13. A display apparatus comprising:

an array of pixel elements, each of which can display a selection of colors, each pixel element being mounted at one end of an individual support member, wherein each support member can be displaced in forwards and reverse directions, is hollow and has a longitudinally extending series of projections on an interior surface thereof;

a control arrangement for controlling the color that is displayed by each individual pixel element; and a drive mechanism comprising a gear which is engaged with the projections, and a motor for rotating the gear, rotation of the gear causing longitudinal movement of the support member with respect to the drive mechanism; wherein the support member is of generally "U" shaped cross section, with opposed side walls connected by a top wall, and the series of projections are on the interior of the top wall; and the display apparatus is arranged to apply a resilient force to the side walls of the support member to limit lateral movement of the support member;

the display apparatus further comprising first and second arrangements for applying said resilient force to the side walls of the support member, wherein the first and second arrangements apply force at places longitudinally spaced from each other.

* * * * *